United States Patent [19]

Jessmore

[11] Patent Number: 4,601,552

[45] Date of Patent: Jul. 22, 1986

[54] BINOCULAR CONSTRUCTION HAVING ADJUSTABLE FILTERS

[76] Inventor: Floyd E. Jessmore, 1741 Sullivan St., Saginaw, Mich. 48603

[21] Appl. No.: 663,323

[22] Filed: Oct. 22, 1984

[51] Int. Cl.4 .......................... G02B 5/20; G02B 5/30; G02B 23/00

[52] U.S. Cl. .................................. 350/551; 350/545; 350/315; 350/317

[58] Field of Search .............. 350/315, 317, 318, 311, 350/545-556, 145, 146

[56] References Cited

U.S. PATENT DOCUMENTS 409,927  8/1889  Clements ............................. 350/551
2,435,074  1/1948  Fry ...................................... 350/315
3,479,512  11/1969  Weissenberg ....................... 350/315
3,528,724  9/1970  Bertin ................................. 350/551

FOREIGN PATENT DOCUMENTS 431692  7/1935  United Kingdom ................ 350/315

Primary Examiner—Jon W. Henry
Attorney, Agent, or Firm—Learman & McCulloch

[57] ABSTRACT

A binocular construction having a pair of parallel barrels within each of which is a rotary frame supporting a number of different filters. The frames are coupled together for conjoint rotation so as to enable selected ones of the filters to intercept light traversing the barrels.

11 Claims, 3 Drawing Figures

BINOCULAR CONSTRUCTION HAVING ADJUSTABLE FILTERS

This invention relates to a binocular construction containing a number of pairs of filters any selected pair of which may be used.

BACKGROUND OF THE INVENTION

Filters for use with magnifying binoculars have been proposed heretofore and examples of such proposals are disclosed in U.S. Pat. Nos. 2,383,186; 2,408,772; and 3,528,724. The filters disclosed in these patents are polarized filters and are mounted externally of the binocular case. The external mounting of the filters is necessary so as to enable the filters to be used or not to be used, as desired. The external mounting of filters, however, subjects them to excessive wear and damage.

Polarized filters are useful for many purposes, but other filters are equally useful for different purposes. In those instances in which polarized filters are provided for binoculars, they either must be used at all times or dismounted from the binocular case. If another filter is to be used, it must be substituted for the polarized filters, thereby resulting in a tedius and time consuming adjustment.

SUMMARY OF THE INVENTION

A binocular construction according to the invention makes use of conventional lenses, prisms, and cases, the latter of which is modified only to the extent necessary to enable a pair of rotary filter supports to be mounted within the case for simultaneous rotation so as to present a selected one of a number of different filters to the path light traverses in passing through the binocular. The filters may include a polarized filter, a haze filter, a color absorbing filter, or any other special purpose filter. If desired, the filter carriers may have an opening therein containing no filter so that the user may view an object without utilizing a filter. The filter carriers are secured to gears mounted for rotation about fixed axes and such gears are coupled to a driving gear via a flexible cable equipped at its opposite ends with gears that mesh with the driving and driven gears. Rotation of the driving gear thus effects concurrent rotation of the driven gears and the associated filter carriers, and the arrangement is such that both of the filter carriers rotate simultaneously and in the same direction.

THE DRAWINGS

Apparatus constructed in accordance with a preferred embodiment of the invention is illustrated in the accompanying drawings, wherein.

THE PREFERRED EMBODIMENT

Figure 1:
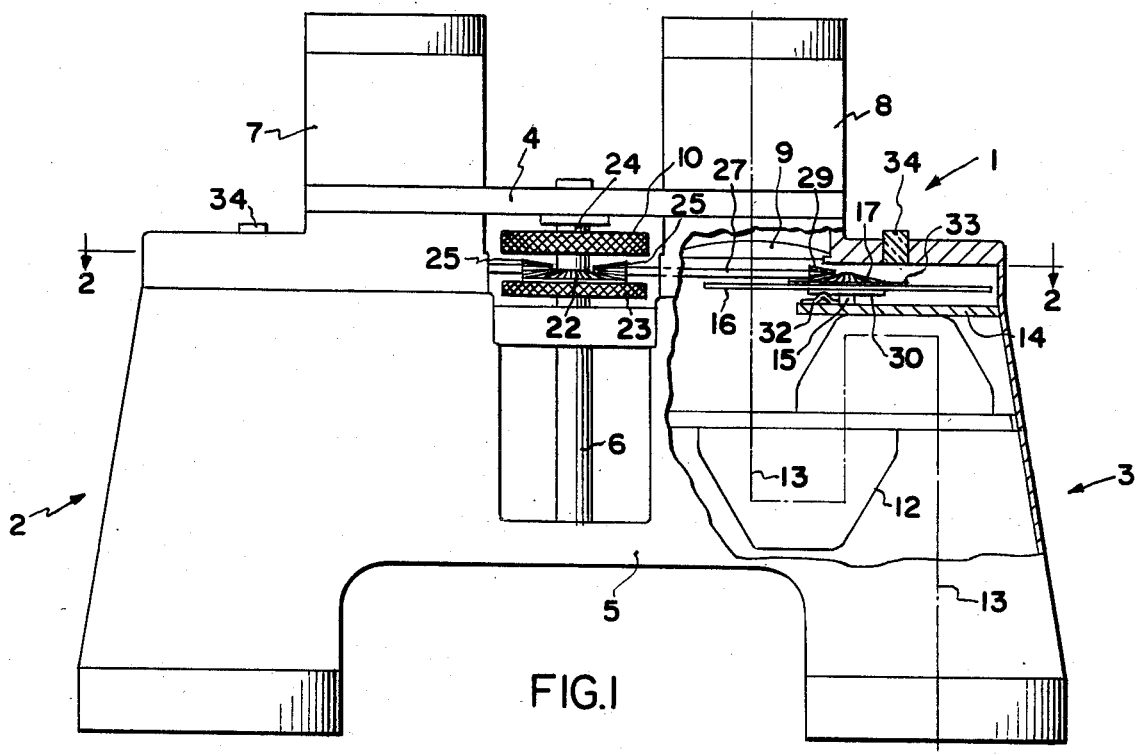
FIG. 1 is an elevational view, with parts broken away, of a binocular equipped with filters according to the invention.

A construction according to the invention comprises a binocular case 1 having two body or barrel members 2 and 3 joined together by upper and lower hinge arms 4 and 5 through which extends a hinge pin 6, as is conventional. Fitted to the respective barrels are eye pieces 7 and 8 containing field lenses 9. The eye pieces are adjustable for focusing purposes in response to rotation of an adjusting wheel 10 that is fixed to a shaft 11 which extends through the hinge pin 6. Each of the barrels includes a porro prism 12 and objective lenses (not shown) so as to provide a light path represented by the line 13 through each barrel and eye piece. As thus far described, the binocular construction is conventional.

Each barrel 2 and 3 is provided with a shelf 14 on which is mounted a shaft 15. Journaled for rotation on each shaft 15 is a circular frame 16 at the center of which is fixed a beveled gear 17. Each frame 16 is of such diameter and is mounted in such position that a portion of the frame lies in the light path 13 between the associated prism and the field lens.

Each of the frames 16 is alike and supports a plurality of circumferentially spaced, segment shaped filters 18, 19, 20, and 21. The filters 18–20 may be of various colors as desired, but the filter 21 preferably is a polarized filter. It is not necessary, of course, to provide each filter carrying frame 16 with four filters; a lesser number may be provided and, if desired, one of the filters 18–20 could be eliminated altogether so as simply to have an opening through the frame. In any event, the filters are so arranged on the frame 16 that they are offset from the axis of rotation of the latter a distance sufficient to be capable of intercepting light traversing the path 13. The filters 18–20 need not necessarily be segment shaped, but such shape is preferred for ease and economy of construction. The size of the polarizing filter preferably is greater than 90°, as shown, so as to enable a full polarizing effect to be achieved.

Means is provided for rotating the filter carrying frames 16 simultaneously and comprises a driving gear 22 fixed to a knurled wheel 23 that is journaled on a sleeve 24 which encircles the focusing shaft 11. The wheel 23 is adjacent the wheel 10, but is rotatable independently of the latter. The wheel 23 preferably is of smaller diameter than the wheel 10 so as to enable the user to distinguish between the wheels by feel.

In mesh with the gear 22 is a pair of conical gears 25 each of which is fixed at one end of a flexible cable 26 housed within a sheath 27 and supported by clips 28 carried by the case 1. Each of the flexible cables 26 has fixed to its other end a conical gear 29 which meshes with the beveled gear 17 carried by the associated frame 16. The arrangement is such that the driving gear and the driven gears are coupled together so that rotation of the wheel 23 in one direction or the other causes simultaneous rotation of the frames 16 and in the same direction. The flexibility of the cables 26 enables the barrels 2 and 3 to be rocked about the axis of the hinge pin 6 so that the eye pieces can be adjusted to the eyes of different users.

Figure 2:
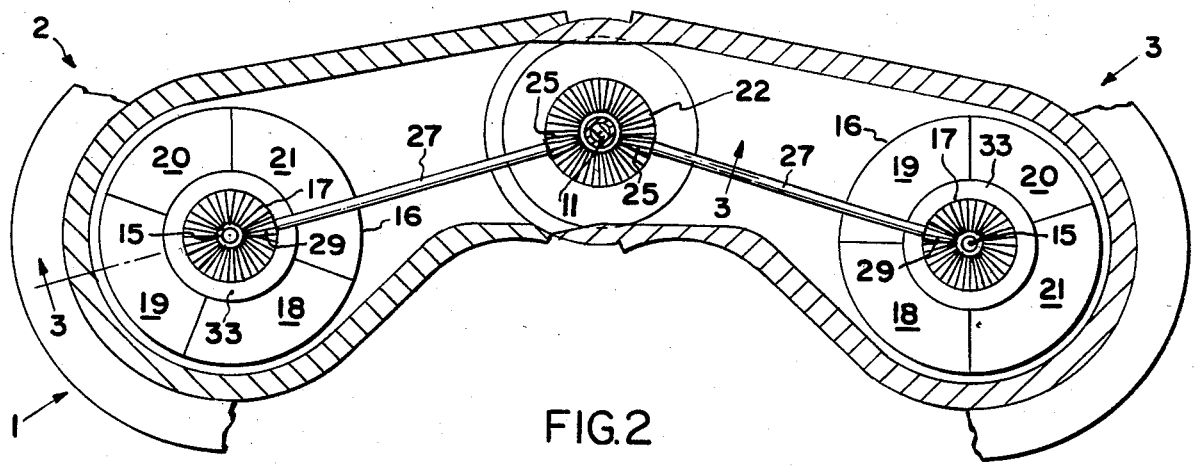
FIG. 2 is a sectioal view taken generally along the line 2—2 of FIG. 1.
Figure 3:
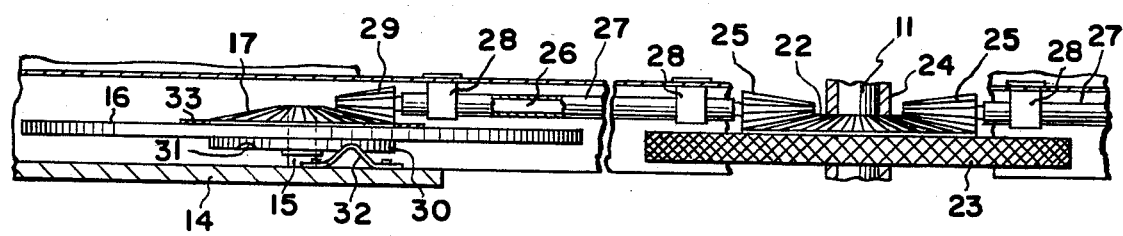
FIG. 3 is a fragmentary sectional view taken along the line 3—3 of FIG. 2.

Since the filter carrying frames 16 rotate simultaneously in the same direction, the relative positions of the frames 16 should be such that corresponding filters will intercept the two light paths 13 simultaneously. Thus, as is shown in FIG. 2, each filter 18 occupies the same relative position with respect to the associated light path 13.

To aid in maintaining the frames 16 in such positions that the filters 18–20 will be centered with respect to the respective light paths 13, each frame 16 carries a disc 30 between the frame and the shelf 14 and in which are three dimples 31 for the removable accommodation of the knee of a detent spring 32 fixed on the shelf 14. Each spring preferably opposes the adjacent conical gear 25 to minimize deflection of the frame 16. The dimples 31 and the spring 32 are so located that, when one of the filters 18–20 is centered with respect to the light path 13, the spring 32 will be accommodated in the associated dimple 31.

Inasmuch as the polarizing filters 21 may require adjustment through a relatively wide angle, no detent is associated with such filters.

To facilitate the positioning of a selected filter in the light path, each frame 16 may be provided with an annular band 33 encircling the associated gear 17 and on which numbers, letters, or other indicia indicative of selected filters are located. Overlying the band 33 and extending through the case is a plastic, magnifying member 34 through which the indicia on the band may be used. If desired, the indicia on the band may be formed with luminescent ink to promote readability.

In operation the binocular may be used in the conventional manner with any corresponding pair of the filters 18–21 located in positions to intercept and affect light traversing the paths 13.

The disclosed embodiment is representative of a preferred form of the invention, but is intended to be illustrative rather than definitive thereof. The invention is defined in the claims.

I claim:

1. A binocular construction comprising a pair of barrels within each of which are lenses and a prism defining a light path; means mounting said barrels side by side for relative rotation about an axis therebetween; a filter support for each of said barrels; means mounting one of said filter supports wholly within one of said barrels and the other filter support wholly within the other of said barrels for rotation about parallel axes of rotation offset from the associated light path; at least one filter carried by each of said filter supports for rotation therewith and extending radially outwardly from its axis a distance sufficient to intercept light traversing the associated light path; driving means; means mounting said driving means between said barrels for rotation about the axis of rotation of said barrels; and drive transmitting means extending from said driving means into said barrels and coupling said driving means to each of said filter supports for rotating said filter supports conjointly about their axes.

2. A construction according to claim 1 wherein said driving means comprises a driving gear, a driven gear carried by each og said filter supports, and a rotary shaft extending from each driven gear to said driving gear.

3. A construction according to claim 2 wherein said rotary shaft is flexible.

4. A construction according to claim 1 wherein each of said filter supports has a section thereof which is optically clear.

5. A construction according to claim 1 wherein each of said filter supports has a plurality of circumferentially spaced, different filters.

6. A construction according to claim 5 wherein one of the filters of each filter support is polarized.

7. A construction according to claim 6 wherein each of said polarized filters has a circumferential length of at least 90°.

8. A construction according to claim 1 including detent means acting on said filter supports for releasably maintaining them in a selected position of adjustment.

9. A construction according to claim 1 including indicia for identifying said filter; and means for viewing said indicia.

10. A construction according to claim 9 wherein said viewing means is a magnifier.

11. A construction according to claim 9 wherein said indicia is luminescent.

* * * * *